Aug. 17, 1937.  T. A. TAYLOR  2,090,271

AIR CONDITIONING APPARATUS

Filed Aug. 26, 1932  4 Sheets-Sheet 1

Thaddeus A. Taylor, Inventor

Aug. 17, 1937.   T. A. TAYLOR   2,090,271
AIR CONDITIONING APPARATUS
Filed Aug. 26, 1932   4 Sheets-Sheet 2
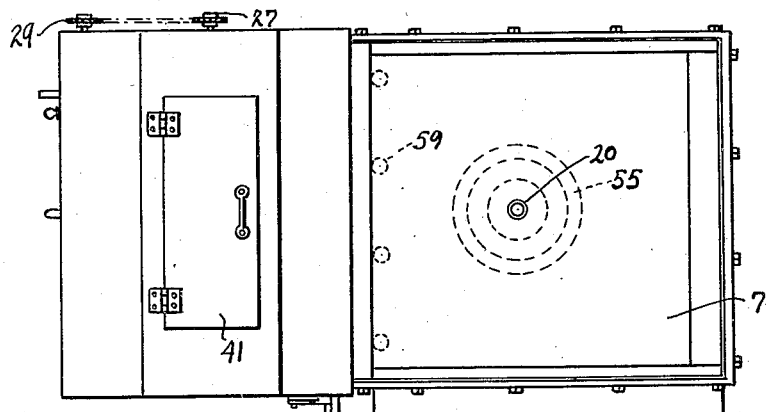
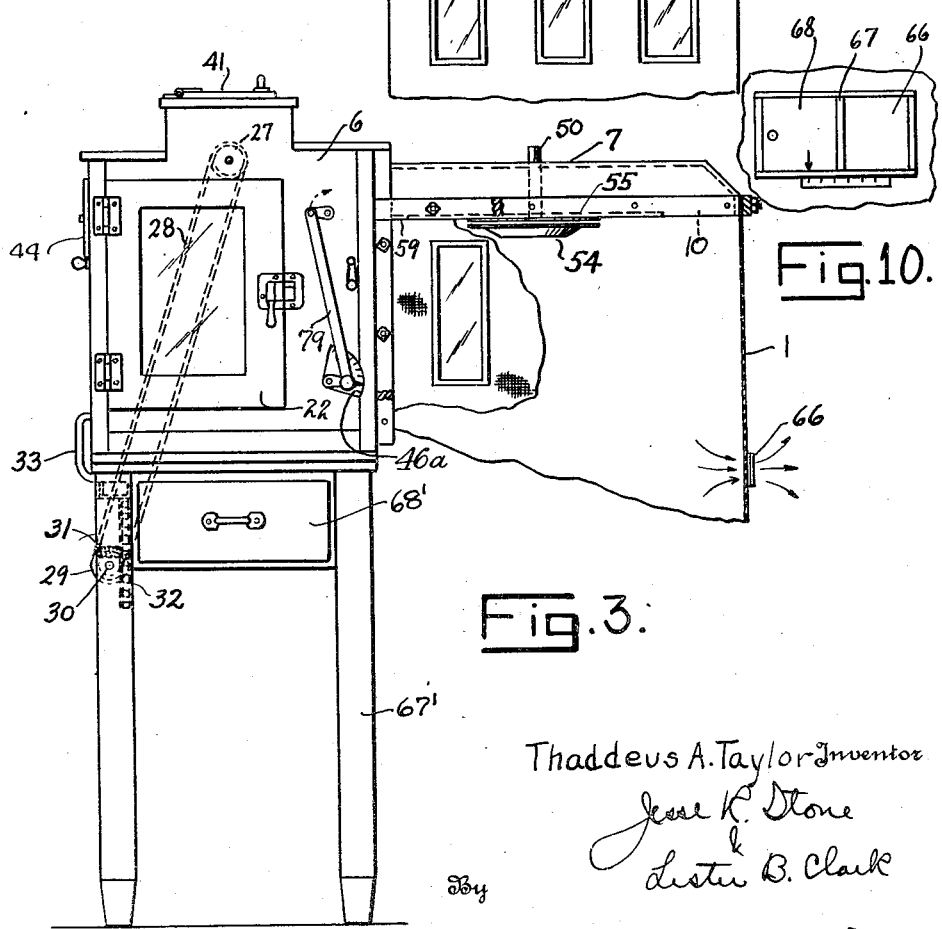

Aug. 17, 1937.   T. A. TAYLOR   2,090,271
AIR CONDITIONING APPARATUS
Filed Aug. 26, 1932   4 Sheets-Sheet 3
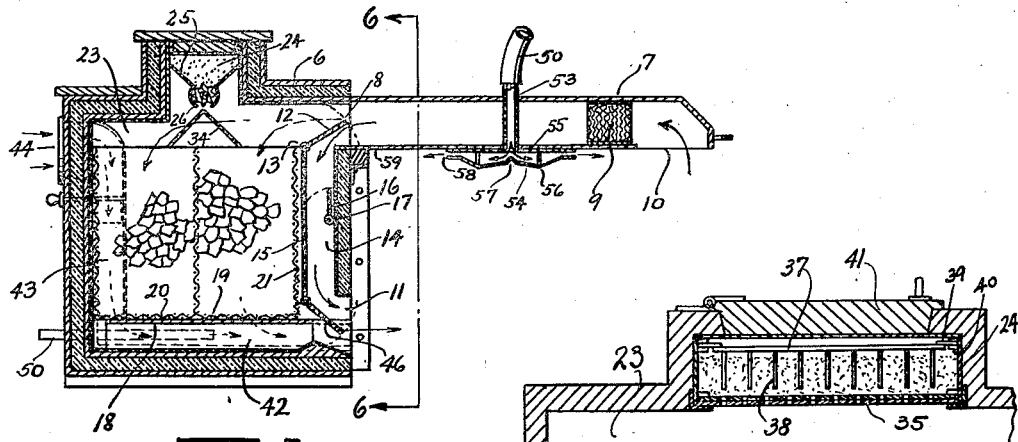
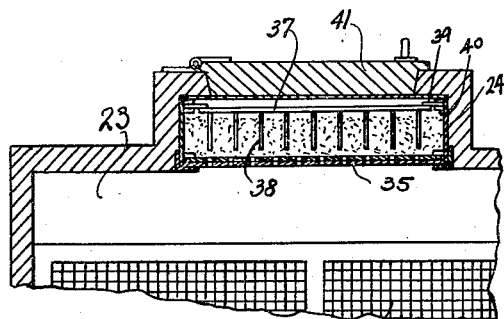
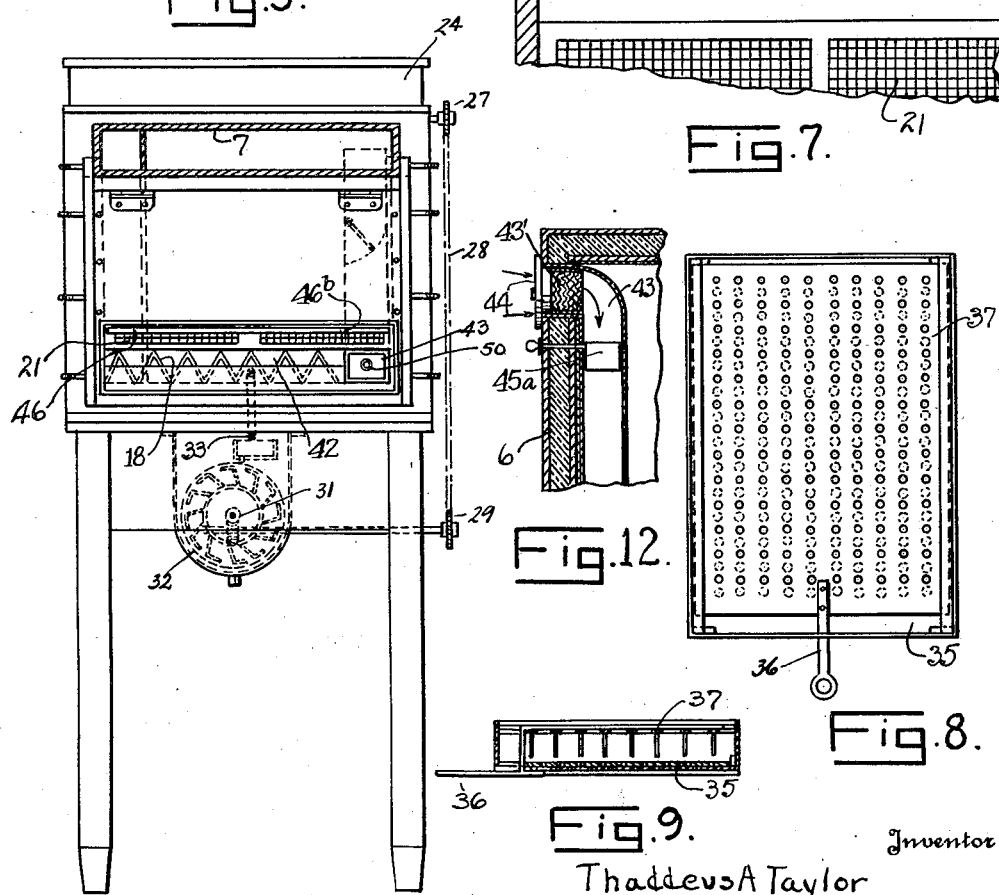
Inventor
Thaddeus A Taylor
By Jesse R. Stone
& Lester B. Clark
Attorneys Patented Aug. 17, 1937

2,090,271

UNITED STATES PATENT OFFICE 2,090,271

AIR CONDITIONING APPARATUS

Thaddeus A. Taylor, Lufkin, Tex.

Application August 26, 1932, Serial No. 630,497

11 Claims. (Cl. 128—191)

My invention relates to devices for and method of conditioning air within an enclosure.

It is frequently desirable to regulate the temperature and oxygen content and other conditions relative to the air within an enclosure such as a tent or chamber. This is desirable particularly in hot weather whether for use in the sick room or simply to make the conditions within the enclosure more agreeable for one occupying the same.

It is an object of my invention to provide a unit which may be portable if desirable and which is light and compact and capable of operation in an economical manner, whereby the air content of the enclosure may be regulated relative to temperature, humidity, oxygen or gas content in the manner desired.

I contemplate the provision of a control box in connection with my conditioning means which shall operate largely in an automatic manner to control the temperature and humidity of the adjacent enclosure and to also control the oxygen or gas content of the same.

The control unit includes means for supplying oxygen or other gas or outside air and regulating the temperature of the air passing through the box, the whole apparatus operating largely by convection due to cooling of the air within the box.

The invention also includes an improved oxygen distributor for use in charging the enclosure with oxygen or other gas quickly and economically.

The invention also resides in the particular construction of the device whereby the oxygen may be distributed, the cooling means adjusted, and regulated, and the complete device assembled and supported in a suitable manner.

With reference to the drawings herewith, Fig. 1 is a perspective view showing the general assembly of the parts making up my apparatus.

Fig. 3 is a side elevation, certain parts being removed and broken away for greater clearness.

Fig. 4 is a top plan view of the device.

Fig. 5 is a sectional view of the control box and the inlet chute or flue connected therewith, taken in central vertical section.

Fig. 6 is an end view taken in section on the line 6—6 of Fig. 5.

Fig. 7 is a broken detail of the upper end of the box.

Fig. 8 is a top plan view of the agitator for the salt.

Fig. 9 is a transverse section of the agitator shown in Fig. 8.

Fig. 10 is a detail of the regulating valve in the end of the tent or enclosure.

Fig. 12 is a sectional detail of the air inlet.

Figure 1:
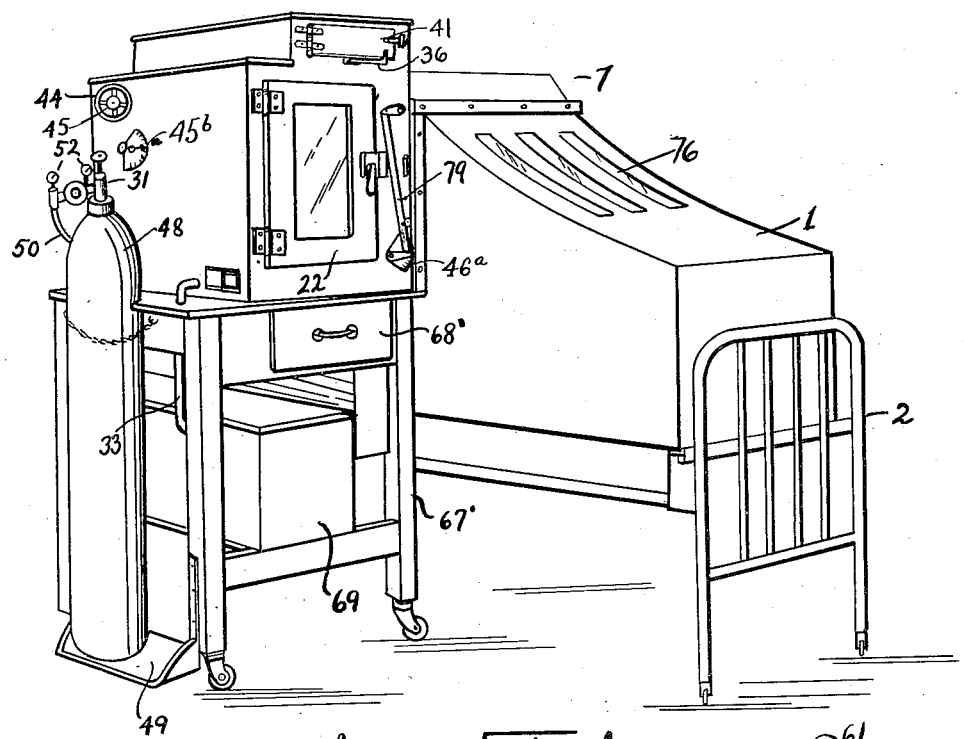

In the construction of my device I have shown a tent 1 as forming an enclosure to be used in connection with a bed 2. This is for purposes of illustration, it being understood that my invention is adapted to be used with any desired form of enclosure. The tent shown may be understood as having a bottom thereto resting upon the springs of the bed. A mattress shown at 3 in Fig. 2 may be supported upon the floor of the tent and above the mattress an opening may be made to obtain access to the interior of the tent. I have shown a longitudinal slit at 4, which may have a zipper fastening thereto so that it may be opened and closed readily to obtain access to the interior. There may be also a side window 5 and top windows 76, this being optional with the user.

The upper end of the tent toward the head portion of the bed is closed by an extension 7 formed upon the control box 6. This extension forms a circulating flue with its inlet opening spaced toward the side of the tent away from the box. The tent is connected at its upper side with the extension 7 and has an opening the edges of which are fitted about the control box, the said opening being sealed about the box but allowing circulation of air from the tent through the flue 7 to the box and back again into the tent.

With reference particularly to Fig. 5, the construction of the extension and the box may be understood.

The extension 7 is of the full width of the control box 6 and communicates at one side with the opening 8 leading into the upper end of the box. The extension forms a flue of flattened shape having a lower wall in which an opening 10 is formed in the outer end communicating with the upper portion of the tent. It will thus be understood that air from the tent will circulate up and through the flue to the opening 8 and from thence into the box.

The control box 6 is of rectangular shape as shown. It has an opening 8 at its upper end leading to the flue 7 and at its lower end is an opening 11 leading back into the tent. The passage of air from the tent to the box is controlled at the opening 8 by a damper or valve 12, which is pivoted at 13 to swing in such manner as to close direct connections between the openings 8 and 11 through the passage 14 or to close the passage leading directly into the body of the box.

The passage 14 referred to is formed by a partition wall 15, spaced slightly from the forward side 16 and allowing circulation of air directly back into the tent without passing over the cooling elements within the box. In the passage 14 is a valve 17 which may also be employed to regulate the flow of air through the passage 14.

The interior of the box is surrounded by insulating walls which may be formed of any desirable material and has centrally thereof a container for a cooling element. I have shown a supporting frame 18 spacing the containers from the bottom of the box and upon which the ice containers 19 and 20 may be supported. These ice containers are preferably formed with foraminated walls 21 at the sides and bottom and are intended to contain cracked ice through which the air may circulate. I have shown two ice containers which are of small enough capacity so that they may be easily handled in use.

A door 22 at one end of the box is provided to obtain access to the interior thereof so as to insert or remove the ice containers or any other devices which may be included within the box.

Above the ice containers is a space or chamber indicated at 23, and above this space the box is extended up centrally to provide a chamber 24 in which salt may be placed. I have shown the salt within this extension placed within a container having downwardly inclined walls 25 leading to a rotating member 26. Upon one end of the rotating member 26 is formed a wheel 27, shown in dotted lines in Fig. 3, said wheel being connected by means of a chain 28 to the wheel 29 mounted upon a shaft 30 on the frame below the box. This wheel 29 may be connected by means of gears 31 to a water wheel 32, arranged to receive the drippings from the melting ice. Said drippings pass from the lower side of the box through a short pipe 33 to the upper end of the water wheel 32.

The salt passing from the upper container 24, falls upon a downwardly inclined screen 34, which directs the salt into the two ice containers and upon the ice, thus tending to hasten the melting of the ice and thereby lowering the temperature of the enclosure.

While I have shown automatic means for agitating the salt and feeding it to the ice, it is to be understood that the feeding of the salt on the ice may be operated by hand if desired, and in Figs. 7, 8 and 9 I have indicated such an arrangement. The upper extension 24 of the control box is formed with a floor separating it from the interior of the box, said floor being made up of two foraminated members, one above the other, indicated at 35. The lower one of these members is arranged to be reciprocated through a handle 36 extending through the wall of the box, and it will be obvious that when the lower screen member is reciprocated the openings in the two walls will intermittently register in such way as to allow the salt to sift through during its operation. I contemplate assisting in maintaining the salt in pulverized condition by means of a rake adapted to move in the salt when the screen is reciprocated. This rake has an upper plate 37 the full length of the box, and on the lower side of this plate are spaced downwardly extending prongs 38, which extend into the mass of salt and tend to break it up when the rake is moved back and forth.

The upper plate 37 of the rake has extensions 39 at each side fitting within grooves 40 in the wall of the salt box which furnish a guide which supports the rake and allows its smooth reciprocation. The reciprocation of the rake is accomplished by connecting the rake to the handle 36 of the salt sifter so that both rake and salt sifter may be simultaneously operated. The upper end of the side of the extension containing the salt may be closed by a door 41 of any desired construction, either on the top or the side thereof, and the salt sifter may be removed therefrom as a unit.

The fluted form of the frame 18 at the lower side of the ice containers provides a plurality of passages 42 for air, oxygen, or the like. At the right of this passage, as viewed in Fig. 6, is a separate flue for the outside air. The rearward end of this latter flue or passage connects with an air passage shown in dotted lines in Fig. 5 at 43, which has an air inlet 44 at the upper rearward side of the box. This air inlet may be supplied with an anemometer 45 or other device for observing the flow of air therein, as seen in Fig. 1. It is intended by this means to allow the inlet of outside or room air through the control box to the interior of the tent, the air passing in through the opening 44 and downwardly through the passage 43 to the forwardly extending portion of this passage and from thence through the opening 11 to the interior of the tent. The passage 42 may be closed or regulated as to the passage of air therethrough by means of a valve or damper 46 pivoted at its upper end to the forward wall 15 of the ice compartment. A notch is provided in the valve member 46 at the end where it tends to close the opening from the passage 43. This notch or recess is indicated at 46$^b$ in Fig. 6. A scale 46$^a$ is placed on the outer wall of the box against which a pointer on the handle of the valve may bear so that the desired adjustment of the valves 12 and 46 may be made with accuracy and the position of the valves determined at all times. Also an air filter may be placed in this passage 43 as shown at 43' by means of which impurities carried in the air stream may be eliminated. A valve 45$^a$ may also be employed in the passage 43 for further regulation of the air supply, and an adjustment scale at 45$^b$ on the box is arranged so that the position of that valve may also be observed and accurate adjustment obtained.

The valves 12 and 46 are arranged for simultaneous operation by means of a connecting link 79.

Oxygen may be fed into the air stream from a container 48, supported at 49 on the frame of the box and delivering oxygen through a flexible pipe 50 to the passage 43. This stream of oxygen may be regulated as to amount by valves (not shown) and the pressure thereon may be noted by means of gauges 52 at the connections between the container 48 and the pipe 50.

As an alternative arrangement for passing the oxygen to the tent, I contemplate connecting the hose 50 from the container 48 to a pipe 53 extending downwardly across the extension 7 upon the box and connecting with a distributor 54 within the tent and upon the lower wall of the extension 7. This distributor is made up of an upper plate 55, which is a flattened circular disc, and a lower plate 56 spaced slightly from the upper plate and formed with its central point 57 convex on its upper side, so as to direct the stream of oxygen in all directions toward the outer margin 58 where it is delivered into the upper portion of the tent. I may form a series of openings 59 in the wall 9 of the extension and closely adjacent the control box through which eddy air currents from the tent may pass upwardly into the box extension and directly to the box, as will be obvious. The oxygen distributor is particularly useful in filling the tent with oxygen in the initial charging of the tent for use. The vent or outlet valve 66 from the tent is opened and the oxygen may be distributed through the upper portion of the tent without the loss of any material amount of the gas, through outlet valve 66.

The valves in the control box will be closed because the air in the tent will have been cooled and in this manner shut off circulation of air in the tent and as the oxygen is warmer than the air in the tent, it will stay on top and crowd the room air out through the outlet 66 without material waste of oxygen.

Figures 2, 11:
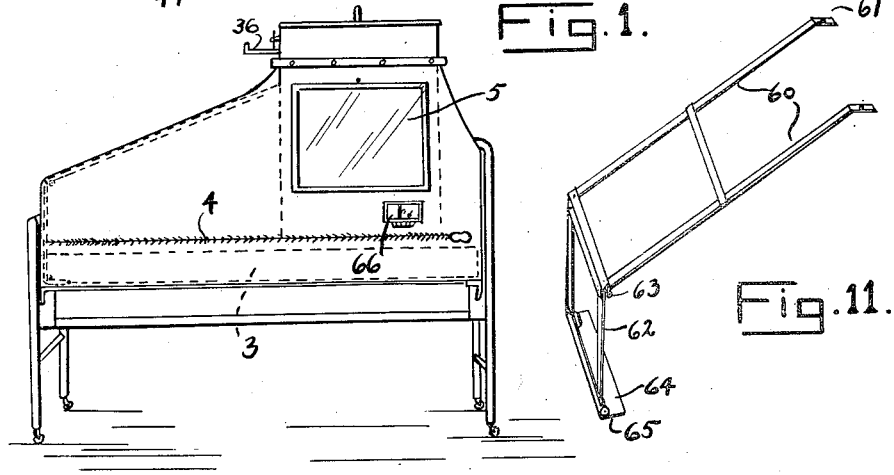
Fig. 2 is an end elevation of the assembly shown in Fig. 1.
Fig. 11 is a perspective view of the supporting frame for the tent.

In supporting the tent upon the bed I contemplate the use of a frame member shown in Fig. 11. This frame member is composed of two side irons 60, which have their ends 61 bent to engage along the upper side of the extension 7 and are inclined downwardly to a point spaced above the lower end of the bed. It is then directed downwardly at 62, the extension 62 being hinged at 63 to the inclined member 60. At the lower end of the frame member 62 is an inwardly directed plate or flange 64, which may be engaged beneath the mattress of the bed. This frame member supports the top of the tent in spaced relation from the interior and may be easily removed and folded together when necessary. The plate member 64 can be hinged at 65 to the frame member 62 if desired.

Figure 13:
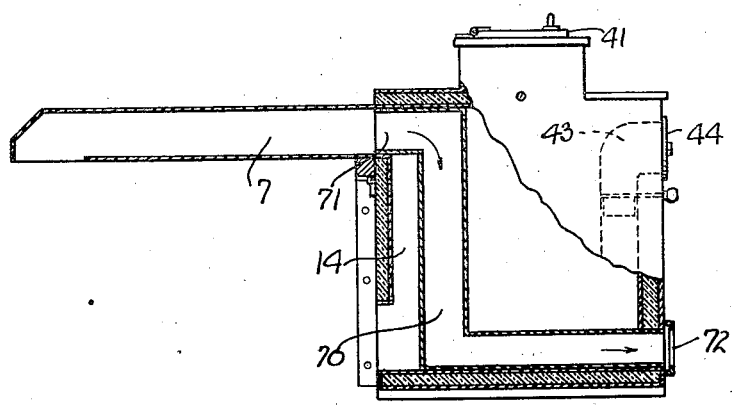
Fig. 13 is a side view of the box, parts of which are broken away for greater clearness.
Figure 15:
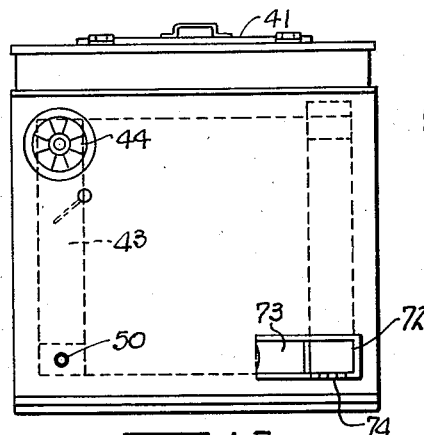
Fig. 15 is a rear end elevation.
Figure 14:
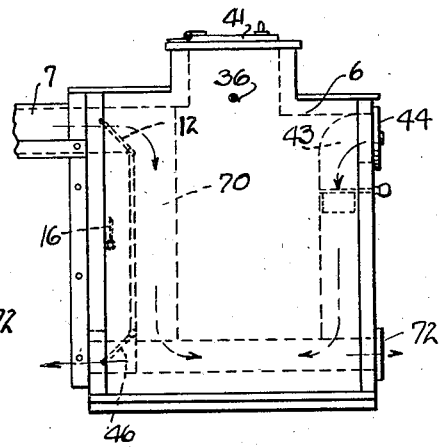
Fig. 14 is a side elevation with the interior construction shown in dotted lines.
Figure 16:
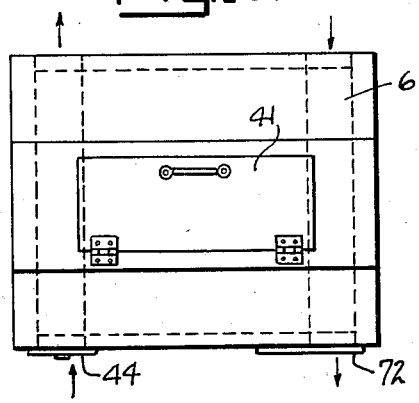
Fig. 16 is a top plan view of the box.

In order that the air within the tent may be maintained fresh and provided with the proper percentage of the rarer gases, the air within the tent must be allowed to escape so as to provide for the inlet of outside air through the passage 43, as previously described. With reference therefore to Figs. 13, 14 and 15, I have shown a passage 70, the upper end of which communicates at 71 with the flue or passage 7 at the upper end of the tent. The warmer gases in the tent will be partially directed into the opening 71 to the passage 70, and will pass downwardly at the side of the box behind the passage 14 previously described, and will be directed along the bottom of the box to an outlet opening 72. This outlet is shown best in Fig. 15. There is a sliding valve 73, which may be adjusted along a graduated margin 74 to regulate the size of the outlet opening, as will be easily understood. I am thus enabled to allow the escape of a small amount of air from the upper side of the tent through the air passage 7 and the box to the outside. This enables me to dispose of the warmer and impure air at the upper side of the tent and to replace it through the passage 43 at the opposite side of the box with fresh air from the exterior of the box. By adjustment of the valve 73 at the outlet of this passage, the interchange of air may be accurately regulated. It will be noted that this operation of interchanging the air is carried on automatically and entirely by convection without the necessity of any mechanical agitator.

The vent 66 in the side of the tent opposite the control box is provided as previously described. This vent is shown best in Fig. 10. It has an outer frame 67, which may be secured around the margin of the rectangular opening in the tent. There is a sliding valve or gate 68, which may be moved to control the amount of opening through this vent, from which tent air may pass out in a regulated manner whenever the tent is to be charged with oxygen. A scale along the margin of the gate is provided, so that accurate regulation of the size of the opening may be accomplished. It will be noted that the operator is enabled, by the setting of the inlet and outlet valves from the tent to the box and back to the tent, to accurately and scientifically control circulation of air and oxygen in the tent and to regulate the temperature thereof. The usual untrained attendant, by following directions, may control the circulation without difficulty.

In the use of my device the valves or dampers may be regulated as desired to control the circulation of air from the tent to and from the control box. If it is desired to cool the air the valve 12 may be swung downwardly so as to allow the circulation of air from the tent directly into the chamber 23 above the ice. It may there be cooled and the cooled air will move downwardly through the container into the passage 42. The valve 46 will simultaneously be opened to allow cooled air to flow through the opening 11 into the tent. This circulation may be entirely by convection, the cooled air from the interior being heavier will flow through the lower opening 11 into the warmer atmosphere of the tent. The amount of circulation may be controlled by the two valves or dampers 12 and 46. If it is desired to cool the air more rapidly the salt distributor may be operated to feed the salt upon the ice and increase the melting thereof, so as to further lower the temperature. This distributing of the salt may be done by hand, if the hand-operated embodiment is used, or I may depend upon the slow operation of the agitator 26 through the connections thereof with the water wheel 32, as previously noted.

If the air is sufficiently cool, the dampers 12 and 46 may be closed, so as to allow the circulation of air thru the passage 14 and the rate of flow may be still further regulated by means of the valve 17 in the passage 14. It will be obvious that I am enabled through the operation of the various valves to entirely control the circulation to and from the box and the temperature in the tent. An air filter 9 may be placed in the air passage in the flue 7 to take out impurities therefrom where found necessary or desirable.

During the operation of my device it is desirable to allow the escape of some of the used air within the tent and to supply further fresh air thereto. Other of the rarer gases ordinarily contained in the air are desirable, and fresh air is thus necessary within the tent. This is supplied by opening the inlet valve 45ª and allowing the flow of air from the outside through the box to the interior of the tent. To allow the escape of a certain proportion of the air already in the tent to thus provide for additional air, the valve 73 in the outlet 72 is regulated to allow the slow escape of the air already in the tent. The proper regulation and control of the inlet and outlet valves for this additional air is an important feature in my invention.

The circulation of air in the tent is caused not only by convection but by the entrance of oxygen under pressure from the tanks. The oxygen tends to displace air in the tent and the air thus displaced finds a vent with the excess air escaping through the outlet passage 70. The amount of fresh air and oxygen can be definitely and accurately controlled and no mechanical motors are necessary. As previously noted, my arrangement of valves and the scales adjacent thereto makes it possible to operate the control box and the enclosure, so that accurate regulation may be easily accomplished.

In connection with my control box I may support the same upon a portable stand 67' and drawers 68' may be provided for additional ice and other containers, and receptacles may also be supported upon the frame as, for example, a receptacle 69 for the liquid flowing downwardly from the melting ice. My invention resides, however, in the particular arrangement of the control box and enclosure whereby the temperature and air content of the enclosure may be varied to suit the needs of the occupant. The advantages lie in the simplicity of the device and the ease by which the content of the air may be controlled to suit the needs of the operator.

The elimination of carbon dioxide from the air is accomplished in the circulation of air from the tent through the air duct, for the carbon dioxide will be mixed with the air and will be gradually eliminated with the used air. No soda lime or other purifying agent is necessary. Further, by placing the air inlet from the tent to the box at the outer end 10 of the flue, the cooled air is compelled to circulate generally in the tent and a more even distribution of the pure cooled air is obtained.

What I claim as new is:

1. A device of the character described including an enclosed chamber having an opening therein adjacent the upper end thereof at one side, a control box fitting said opening, a flue leading from said chamber into the upper end of said box, means to control the passage of air through said box, an outlet from the lower end of said box to said chamber, means to cool said air whereby it is circulated by convection, means to regulate the entrance of outside air to said box, and an outlet through said box for excess air from said chamber.

2. A device of the character described including an enclosed chamber having an opening therein adjacent the upper end thereof at one side, a control box fitting said opening, a flue leading from said enclosure into the upper end of said box, means on the lower side of said flue to distribute oxygen in said enclosed chamber, means to control the passage of air through said box, an outlet from the lower end of said box to said chamber, means to cool said air whereby it is circulated by convection, means to regulate the entrance of outside air to said box, and an outlet through said box for excess air from said chamber.

3. A device of the character described including a control box having inlet and outlet openings at one side thereof, a lateral extension at one side of said box forming a flue connected with said inlet opening, a tent secured to said extension, a foldable frame secured to said extension and inclined laterally and downwardly to support said tent, an air port in said box opposite said inlet opening and a vent from said tent through said box for said air.

4. A device of the character described including a control box having inlet and outlet openings at one side thereof, a lateral extension at one side of said box forming a flue connected with said inlet opening, means in said box to cool the air passing therethrough, a tent secured to said extension, a foldable frame secured to said extension and inclined laterally and downwardly to support said tent, an air port in said box opposite said inlet opening and an outlet passage from said tent for said air.

5. In a device of the character described, a control box, a laterally extending inlet flue thereon, an oxygen distributor below said flue, a tent connected with said flue and box, an outlet from said box to said tent, an ice container in said box, a deflector above said container, means to deliver salt on to said deflector, means to agitate said delivering means, and means to regulate the air passing through said box.

6. In a device of the character described, a control box, a laterally extending inlet flue thereon, an oxygen distributor below said flue, a tent connected with said flue and box, an outlet from said box to said tent, an ice container in said box, a deflector above said container, means to deliver salt on to said deflector, means to agitate said delivering means, said agitating means operating in response to the dripping of water from the melting ice, and means to regulate the air passing through said box.

7. A control box having inlet and outlet openings, a chamber connected with said openings, means to direct air from said chamber to the upper of said openings, an ice container in said box, means to assist in melting ice in said container including a salt agitator above said container, a water motor below said container and operative connections between said agitator and said motor.

8. A method of charging an enclosure with oxygen comprising providing a vent near the lower end of said enclosure, delivering said oxygen laterally from a point at the upper end of said enclosure, and forcing the air in said tent downwardly and out said vent by the pressure of said oxygen until the desired amount of oxygen has been delivered into said enclosure and then closing said vent.

9. In a device of the character described, an enclosure, a control box connected therewith through an opening in one side thereof, a cooling element in said box, a passage through said box for outside air to said enclosure, a passage from said enclosure through said box for air from said enclosure, the flow of air to and from both said passages being actuated entirely by convection and means to control the passage of air through either of said passages.

10. A control device for convectional circulation of air including a box, a laterally extending inlet flue at one side adapted for connection with a tent, an outlet from said box to said tent below said inlet flue, means in said box to cool said air and a passage from said tent through said box to allow an outlet from said tent for excess air.

11. A device of the character described including a control box having inlet and outlet openings at one side thereof, a lateral extension at one side of said box forming a flue connected with said inlet opening, cooling means in said box to cool the air passing therethrough including an ice container, means to automatically deliver salt at intervals to said ice container, a tent secured to said extension, a foldable frame secured to said extension and inclined laterally and downwardly to support said tent, an air port in said box opposite said opening, and an outlet passage from said tent for said air.

THADDEUS A. TAYLOR.